United States Patent
Orr et al.

(10) Patent No.: US 10,872,203 B2
(45) Date of Patent: Dec. 22, 2020

(54) DATA INPUT SYSTEM USING TRAINED KEYPRESS ENCODER

(71) Applicant: Microsoft Technology Licensing, LLC, Redmond, WA (US)

(72) Inventors: Douglas Alexander Harper Orr, Brentwood (GB); Juha Iso-Sipilä, London (GB); Marco Fiscato, London (GB); Matthew James Willson, London (GB); Joseph Osborne, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 15/355,685

(22) Filed: Nov. 18, 2016

(65) Prior Publication Data

US 2018/0143964 A1    May 24, 2018

(51) Int. Cl.
| | |
|---|---|
| *G06F 17/00* | (2019.01) |
| *G06F 40/274* | (2020.01) |
| *G06F 3/0488* | (2013.01) |
| *G06F 3/023* | (2006.01) |
| *G06F 40/232* | (2020.01) |

(52) U.S. Cl.
CPC .......... *G06F 40/274* (2020.01); *G06F 3/0237* (2013.01); *G06F 3/04886* (2013.01); *G06F 40/232* (2020.01)

(58) Field of Classification Search
CPC ............... G06F 17/2766; G06F 3/0482; G06F 3/04886; G06F 17/273; G06F 16/182
See application file for complete search history.

(56) References Cited

U.S. PATENT DOCUMENTS

| | | |
|---|---|---|
| 9,122,376 B1 | 9/2015 | Brotherston et al. |
| 9,552,549 B1 * | 1/2017 | Gong ................ G06N 3/0454 |
| 2003/0023420 A1 | 1/2003 | Goodman |

(Continued)

OTHER PUBLICATIONS

Bosch, et al., "Effects of Context and Recency in Scaled Word Completion", In Computational Linguistics in the Netherlands Journal, Dec. 2011, pp. 79-94.

(Continued)

*Primary Examiner* — Di Xiao
(74) *Attorney, Agent, or Firm* — Schwegman Lundberg & Woessner, P.A.

(57) ABSTRACT

A data input system is described of the type which has a virtual keyboard which enables a user to type a text sequence into a computing device. The data input system has an input probability generator which is configured to compute keypress evidence. The keypress evidence comprises probabilities that user input events at the virtual keyboard correspond to characters or keyboard functions. The data input system has a trained keypress encoder, having been trained using keypress evidence and corresponding words. The trained keypress encoder encodes the keypress evidence into a numerical encoding. The data input system has a completion/correction predictor which is configured to take as input, the numerical encoding and an encoding of one or more text items of the text sequence already input to the computing device, in order to predict a text item in the text sequence.

20 Claims, 5 Drawing Sheets

(56) References Cited

U.S. PATENT DOCUMENTS

| | | | | |
|---|---|---|---|---|
| 2011/0301942 A1* | 12/2011 | Collobert | ............. | G06F 40/211 |
| | | | | 704/9 |
| 2012/0324391 A1* | 12/2012 | Tocci | ...................... | G06F 3/048 |
| | | | | 715/773 |
| 2013/0120266 A1* | 5/2013 | Griffin | .................. | G06F 17/276 |
| | | | | 345/168 |
| 2014/0198047 A1 | 7/2014 | Unruh et al. | | |
| 2014/0351741 A1 | 11/2014 | Medlock et al. | | |
| 2015/0347383 A1* | 12/2015 | Willmore | ............. | G06F 17/276 |
| | | | | 704/9 |
| 2016/0299685 A1* | 10/2016 | Zhai | ...................... | G06F 3/0219 |
| 2018/0137349 A1* | 5/2018 | Such | .................... | G06K 9/6273 |

OTHER PUBLICATIONS

Cavalieri, et al., "Combination of Language Models for Word Prediction: An Exponential Approach", In Journal of IEEE/ACM Transactions on Audio, Speech and Language Processing, vol. 24, Issue 9, Sep. 2016, pp. 1477-1490.

Li, et al., "A neural network based solution for automatic typing errors correction", In Journal of Neural Computing and Applications, vol. 20, Issue 6, Sep. 2011, 3 pages.

Kim, et al., "Character-Aware Neural Language Model", In Journal of Computing Research Repository, Aug. 2015, 9 pages.

Lewis, Gene, "Sentence Correction using Recurrent Neural Networks", https://cs224d.stanford.edu/reports/Lewis.pdf, Published on: Oct. 12, 2016, 1-7 pages.

Bengio, et al., "A Neural Probabilistic Language Model", In Proceedings of Advances in Neural Information Processing Systems, Nov. 30, 2000, 7 pages.

\* cited by examiner

DATA INPUT SYSTEM USING TRAINED KEYPRESS ENCODER

BACKGROUND

Virtual keyboards which are soft keyboards displayed to a user such as on a display screen, projected onto a surface or projected into a user's eye via an augmented reality display device, are increasingly used to input data such as text into electronic devices. Virtual keyboards which are predictive keyboards are those where one or more candidate words or phrases are predicted using a language model and those candidates are displayed to a user as part of the virtual keyboard. When a user selects a key of the virtual keyboard depicting a candidate word or phrase, that word or phrase is input to the electronic device. Virtual keyboards with prediction capability are particularly useful for small form factor devices such as smart watches, smart phones and other electronic devices where the size of the device makes it difficult for a user to input text.

The embodiments described below are not limited to implementations which solve any or all of the disadvantages of known data input systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A data input system is described of the type which has a virtual keyboard which enables a user to type a text sequence into a computing device. The data input system has an input probability generator which is configured to compute keypress evidence. The keypress evidence comprises probabilities that user input events at the virtual keyboard correspond to characters or keyboard functions. The data input system has a trained keypress encoder, having been trained using keypress evidence and corresponding words. The trained keypress encoder encodes the keypress evidence into a numerical encoding. The data input system has a completion/correction predictor which is configured to take as input, the numerical encoding and an encoding of one or more text items of the text sequence already input to the computing device, in order to predict a text item in the text sequence.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
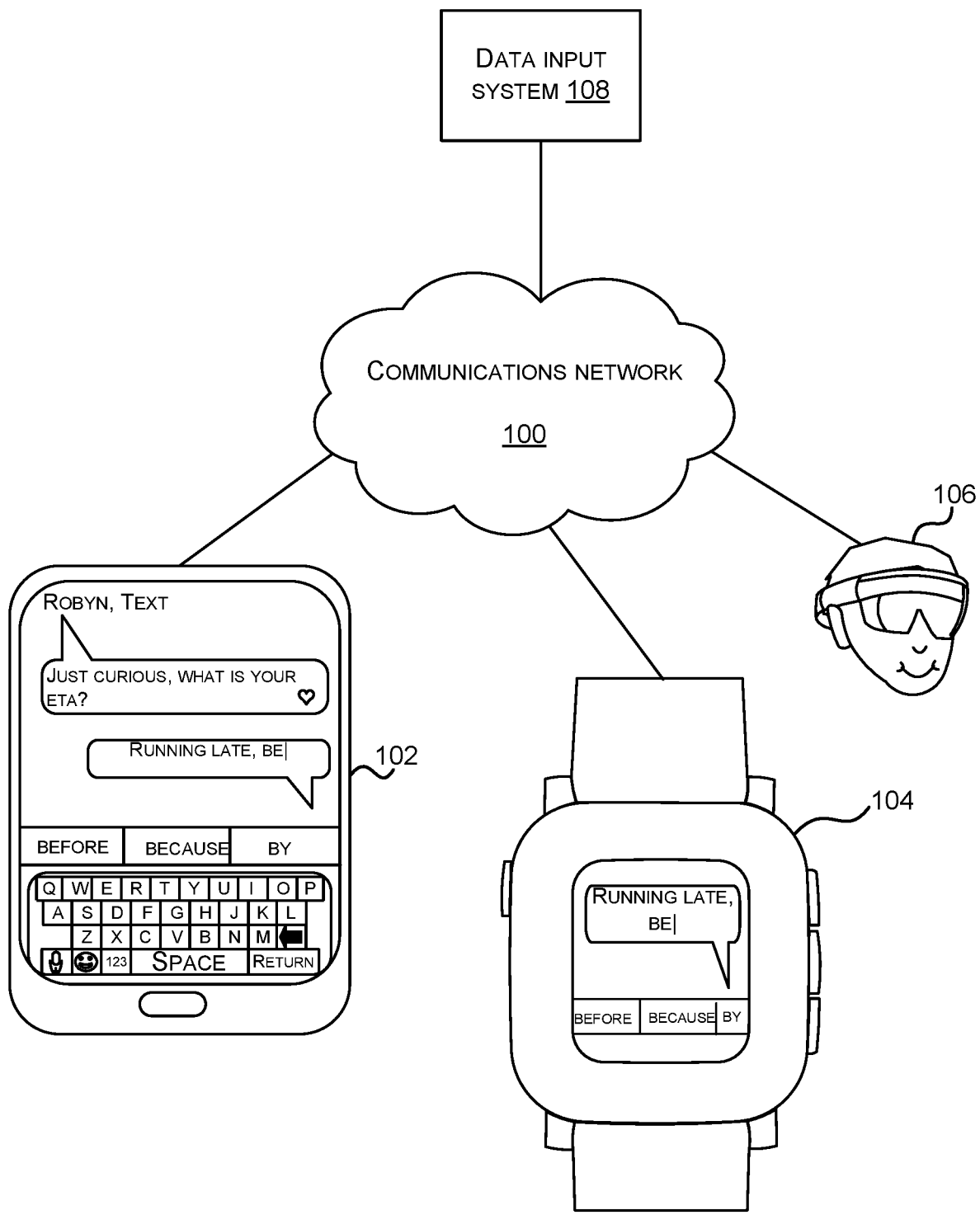
FIG. 1 is a schematic diagram of a plurality of electronic devices having virtual keyboards used for data input.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The inventors have recognized that existing data entry systems used with virtual keyboards are limited in their ability to use key press evidence to its full potential. The embodiments described herein address this by using a trained key press encoder which is trained using key press evidence and corresponding words. By training a key press encoder in this way the key press encoder is able to learn how key press evidence helps to predict words corresponding to prefixes of words a user is trying to type into a computing device using a virtual keyboard. The key press encoder is thus able to learn factors that influence the prediction which may not be apparent to humans. That is, although a human designer of a data entry system can try to think of factors which may influence how key press evidence is to be interpreted, these factors may not be the correct or most useful ones. By using a trained keypress encoder the limitations of the human designer are overcome and a systematic approach is achieved which gives greater accuracy. A trained key press encoder provides a solution using an amount of computing resources and time which is known in advance and which is consistent. However, alternative solutions using heuristics to encode the key press evidence typically use variable compute time and/or variable amounts of computing resource.

The term "key press evidence" is used to refer to likelihoods that one or more characters or keyboard functions have been selected on a virtual keyboard. A non-exhaustive list of examples of keyboard functions is "space", "backspace", "carriage return" and other keyboard keys which correspond to a function rather than a character. When a user makes an input at a virtual keyboard, user input event data is available from an operating system of the computing device or from an application incorporating the virtual keyboard itself. The user input event data comprises coordinates of the user input on the virtual keyboard. For example, the user may touch a display screen which is displaying the virtual keyboard. In another example, the user may direct a point of gaze of his or her eyes to a point on a display of a virtual keyboard, where the display is a projection onto a real world surface or a projection into an eye of the user. In another example, the user makes gesture input such as by pointing his or her finger at a projection of the virtual keyboard onto a real world surface. Using images captured of the user's finger the pointing direction is computed and used to determine coordinates of the user pointing location on the virtual keyboard.

In some examples the coordinates of the user input on the virtual keyboard are used to compute key press evidence by modeling each key of the virtual keyboard as a location specified by a set of coordinates. The likelihood of a key being pressed is then computed using a measure of distance between the known set of coordinates of the key and the observed coordinates of the user input event. The measure of distance is computed for each key so that there is a likelihood for each key, or at least for a subset of keys around the observed coordinates. This type of approach does not take into account history of user key press behavior.

In some examples the coordinates of the user input on the virtual keyboard are used to compute key press evidence by using a learnt set of target models. The learnt set of target models comprises a plurality of probability distributions, one probability distribution for each character of the virtual keyboard. The probability distributions are learnt by observing user behavior. More detail about the target models and how to learn them is given later in this document.

Suppose a user has already typed in the words "I am a" using the virtual keyboard. These words comprise context that is available. The user continues to type and enters the letters "beau". Key press evidence is available for each of the four virtual keyboard selection events. It is not certain at this point whether the user has intended to type "beau" or whether there has been an omission of a character, a reversal of characters, an incorrect character or a combination of mistakes. It is difficult to predict what is the actual prefix that the user intended to enter, whether this be "beau" or some other combination of characters. The inventors have recognized that more information is potentially available in order to predict the word the user intends to enter. This more information comprises past user input behavior such as the user's input style, whether this be from a trajectory of the user input which led to the four user input events, and/or from past user typing behavior at the particular virtual keyboard, at virtual keyboards in general, for the particular user, or for users in general. One approach to using this "more information" is to make use of heuristics such as hard coded rules, criteria, thresholds or other factors to influence how the key press evidence is interpreted. In this approach a character beam search together with a language model is used to construct the prefix from the key press evidence and the character beam search takes into account the heuristics, or the heuristics are applied later. A beam search operates to search a graph of nodes (where each node represents a character for example, in the case of a character beam search) by selecting a sub-set of nodes from the graph and assessing those nodes according to some assessment metric. The search proceeds in the graph along the paths of the assessed nodes which give the best assessment outcome. By limiting the number of nodes which are assessed at each assessment step the beam search is able to explore the graph in a practical manner even for huge graphs with many thousands of nodes (such as in the case of a language model). However, the solution found is not guaranteed to be an optimal solution since many of the nodes of the graph are not considered. Using a beam search gives variable performance since in cases where a rare prefix is being searched for, or where the prefix comprises many frequency occurring characters, the search takes a long time. This means that it is difficult to tell how long a beam search will take to complete for a given situation.

In contrast, the embodiments described herein use a trained key press encoder rather than a beam search with heuristics. The trained key press encoder gives an effective way of interpreting the key press evidence and it captures "more information" as a result of it training, to enable the key press evidence to be interpreted well. The trained key press encoder has a consistent performance in terms of time and computing resources used.

FIG. 1 is a schematic diagram of a smart phone 102 with a virtual keyboard, a smart watch 104 with a virtual keyboard and an augmented reality head-worn computing device 106 which displays a virtual keyboard to the wearer. The smart phone 102, smart watch 104 and augmented reality head worn-device 106 are examples of electronic devices where virtual keyboards are used to input data although other electronic devices may be used with the technology described herein. Each of the electronic devices 102, 104, 106 either comprises a data input system 108 or has access to a data input system 108 via a communications network 100. The data input system comprises predictive keyboard technology and in some examples the data input system is integral with a virtual keyboard. The functionality of the data input system 108 is described in more detail below and it may be shared between an electronic device 102, 104, 106 and a data input system 108 in the cloud in some examples. The data input system is implemented using one or more of: software, hardware, firmware.

Using the data input system the user is able to type in text comprising characters, words, emoji, emoticons, pictograms and other text items. The data input system predicts at least one text item in the sequence, such as the current item and zero, one or more candidate next items in a sequence of text items input by the user and presents these to the user for input to the electronic device. For example, the smart phone 102 of FIG. 1 shows a message being typed in by a user. The user has typed in "Running late" and has started typing another word beginning "be" and the data input system has computed candidate words for input to the electronic device which are displayed on the virtual keyboard and which are "before", "because", "by". The same situation is shown on the smart watch 104.

In the case that the data input system 108 is in the cloud, the electronic device such as the smart phone 102 sends the text input by the user i.e. "Running late be" to the data input system 108 in the cloud. The electronic device such as the smart phone 102 is also able to send key press evidence to the data input system 108 in the cloud. In some cases the electronic device such as the smart phone carries out feature extraction on the key press evidence and sends the extracted features to the data input system 108 in the cloud in order to reduce the amount of data to be sent. The extracted features are independent of the physical characteristics of the electronic device such as the smart phone 102, where those physical characteristics include details such as an aspect ratio of a display of the electronic device, a resolution of the display of the electronic device and other physical characteristics. By extracting features in this way the data input system 108 in the cloud is able to operate without knowledge of particular characteristics of the electronic device. The data input system 108 computes the candidate words and sends these to the electronic device. Other variations on this scheme are possible where various different parts of the data input system functionality is located at the electronic device itself.

Figure 2:
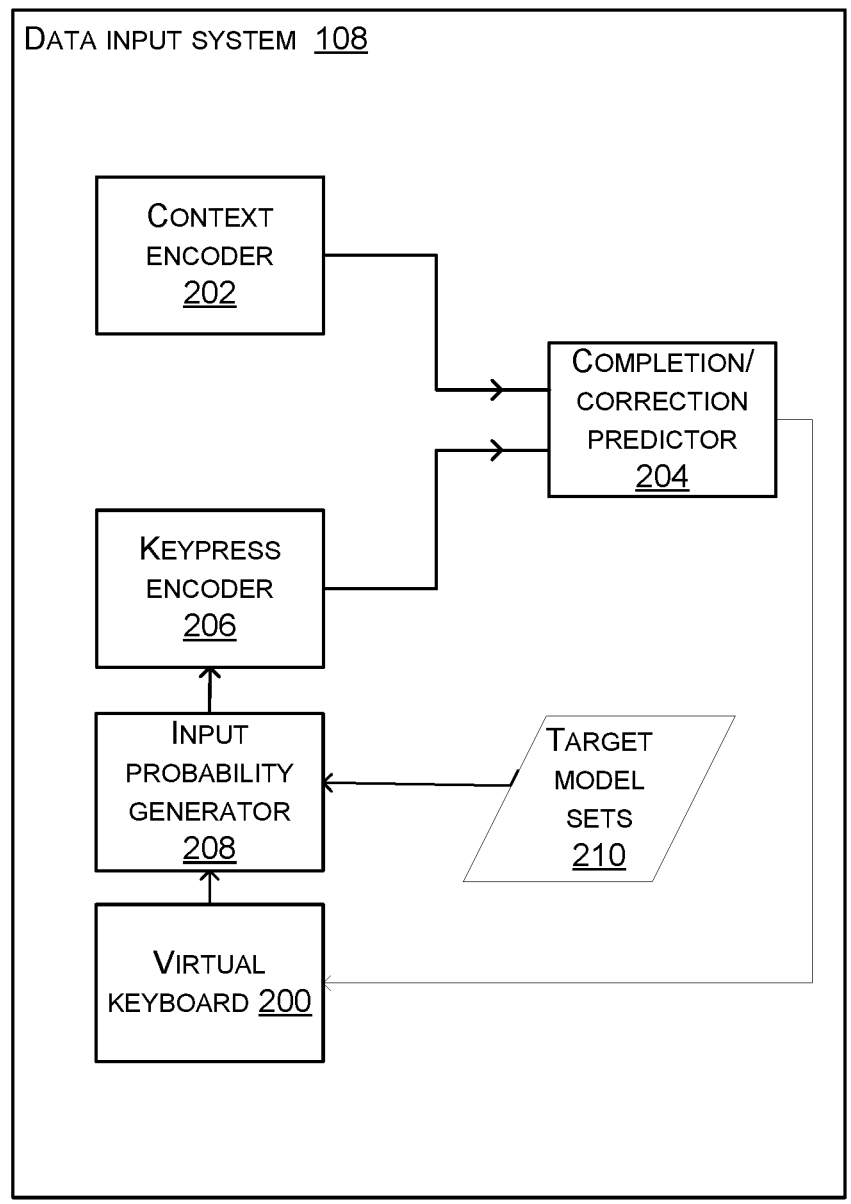
FIG. 2 is a schematic diagram of a data input system such as that of FIG. 1.

FIG. 2 shows the data input system 108 in more detail. The data input system 108 comprises a virtual keyboard 200, a context encoder 202, a keypress encoder 206, a completion/correction predictor 204, an input probability generator 208 and one or more target model sets 210. The virtual keyboard 200 comprises functionality to display a graphical representation that has two or more target points for the user, which correspond to intended input. The target points could be, but are not limited to, character keys (i.e. a grid of virtual keys as in qwerty keyboards), an arrangement of letter glyphs, e.g. as a grid with no visible key boundaries, or a linear letter line A-Z. The virtual keyboard 200 also has functionality to detect user selection events associated with the graphical representation it displays and to obtain coordinates of the user selection events on the graphical representation.

The input probability generator 208 computes the key press evidence using coordinates of user input events it receives from the virtual keyboard 200 or from an operating system of an electronic device. In some cases it computes the key press evidence using one or more target model sets 210. For example, there is a plurality of target model sets 210, one for each of a plurality of different types of virtual keyboard and/or one for each of a plurality of different users. The input probability generator 208 receives information identifying a user and/or identifying a type of the virtual keyboard 200 and uses this to select which target model set 210 to use. The user identity and/or virtual keyboard type is provided by an operating system of an electronic device such as any of the electronic devices of FIG. 1 or from a cloud service. However, it is not essential to use the target model sets 210 as it is also possible to compute the key press evidence by computing likelihoods of characters based on distance of input event coordinates from known coordinates of virtual keyboard keys.

In an example, a target model set comprises a plurality of probability distributions, one for each key of the virtual keyboard. Each probability distribution is referred to as a model and it models locations of a user's previous input events corresponding to the particular key. The probability distributions are 2D Gaussian distributions in some examples. The parameters of the 2D Gaussian distributions (mean and variance) are learnt using maximum a-posteriori estimation based on the user input events corresponding to the target (key). A prior distribution over model parameters is a conjugate prior to the distribution.

The key press evidence computed by the input probability generator 208 comprises, for a single user input event, a list of probabilities for different characters of the virtual keyboard. The key press evidence is computed for each user input event at the virtual keyboard associated with a character of the virtual keyboard, and is sent to the keypress encoder. Thus the keypress encoder 206 receives a stream of key press evidence in real time as the user input events occur at the virtual keyboard 200.

The key press encoder 206 comprises neural network technology which has been trained using training data as mentioned above. In some examples the key press encoder is a recurrent neural network or a convolutional neural network.

A neural network is a collection of nodes (also referred to as units) interconnected by edges and where there are weights associated with the nodes and/or edges. A non-linear function is commonly applied in each node to produce its activation and a non-exhaustive list of non-linear functions which may be used is: sigmoid, tan h, rectifier. During a training phase the weights are updated according to update rules in the light of training examples. The units comprise input units, hidden units and output units. Input units are units at which input is made to the neural network, hidden units are connected between input units and output units (or other hidden units in the case of deep networks), and output units are units at which output from the neural network is observed. A neural network may have a layered construction with a layer of input nodes, one or more layers of hidden units and at least one output layer. During use of the neural network at test time (i.e. after training) as a signal passes through a layer it produces an output via the activations which becomes the input to the next layer of the neural network and so on, until the signal reaches the output layer and the output units are activated. The pattern of activations at the output layer gives the prediction of the neural network. The pattern of activations has been influenced by the weights learnt during the training phase.

A recurrent neural network is one in which connections between at least some of the units form a directed cycle.

A convolutional neural network is one in which, a node in a given layer is connected to a subset of nodes in the preceding layer rather than to all nodes in the preceding layer. The term "subset" means that some but not all of the nodes in the preceding layer are connected to the node.

In some examples, the list of probabilities from the input probability generator 208 is cut to a fixed length by using a thresholding process and used to form a vector for input to a neural network. However, it is not essential to use thresholding in this way where an input layer of the keypress encoder 206 has a slot for all characters and keyboard functions of the keyboard. Initially, when the user has typed in only the single character "b" the keypress evidence distribution corresponding to the character "b" is fed into the keypress encoder 206. As the user types "e" the distribution corresponding to the character "e" is input to the keypress encoder 206 and this process repeats as the user enters more characters. At each step the hidden state of the keypress encoder 206 is updated and an output is generated. The output is a representation of a prefix predicted for the current word at each step of input.

An example in which the key press encoder is a convolutional neural network is now given The vector is fed into the neural network which comprises a set of one-dimensional convolution filters. The maximum output of each one-dimensional convolution over the length of the prefix is then obtained. These maximum outputs are fed through additional dense feedforward layers (such as a highway layer) of the neural network to yield a numerical encoding of the prefix in question. This is one example of an architecture based on convolutions and others are possible.

Where the key press encoder 206 is a recurrent neural network it is a recurrent neural network which has either unidirectionality or is bidirectional. A recurrent cell takes as input a hidden state and a keypress encoding, and generates a new hidden state. The recurrent neural network applies this cell to each of the key press inputs in (forward or reverse) sequence, and the final hidden state is used as the network output. If bidirectional, two such neural networks are applied to the forward and reverse sequences, and the final hidden states are combined using a feedforward network. For example, the recurrent neural network uses gated recurrent units (GRUs) or long short term memory (LSTM) cells.

The key press encoder 206 provides a numerical encoding of the key press evidence that it receives, and where that numerical encoding takes into account learnt information about past behavior observed at the virtual keyboard 200 or other virtual keyboards. The numerical encoding has a fixed or known length/size and is input to a completion/correction predictor 204 together with numerical data from a context encoder 202 as described in more detail below.

The context encoder 202 comprises a neural network which takes as input numerical encodings (referred to as embeddings) of one or more text items that the user has already entered using the data entry system 108 and computes an embedding of one or more candidate text items. For example, the context words "I am a" have been entered by the user and numerical encodings of these words are obtained and fed to the context encoder 202. The text items that the user has already entered may comprise emoji, emoticons, pictograms and other text items in some cases. In some cases the context encoder 202 has access to a store of embeddings and it looks up pre-computed embeddings for the context items "I am a" from that store. In some cases the context encoder 202 comprises a neural network which computes the embeddings and in this case a character compositional recurrent neural network is used to compute the embeddings.

The context encoder 202 neural network is fed the embeddings of the context items and computes an output embedding which represents one or more candidate next text items (e.g. words, emoji, emoticons).

The completion/correction predictor 204 is a neural network which receives as input a concatenated vector formed from the output embedding of the context encoder 202 concatenated with the numerical encoding of the keypress encoder 206. The neural network of the completion/correction predictor 204 is a single layer feedforward neural network which maps the high dimensional input (the concatenated vector) to a lower dimensional space. An output embedding of the completion/correction predictor is obtained and used to compute one or more candidate text items. A similarity measure is computed between the output embedding and each of a plurality of embeddings of text items in a vocabulary. The similarity measure is a dot product or other similarity measure. The similarity measure is used to rank the text items in the vocabulary and to select one or more of the text items from the vocabulary as the candidate text items. In this way candidate items such as "beautiful", "neat", "beat" are found and are presented to the user via the virtual keyboard as candidates for data entry.

In order to train the neural network system comprising the key press encoder 206, the context encoder 202 and the completion/correction predictor 204, training data is used. The training is combined into a single training process which trains the keypress encoder 206, context encoder 202 and completion/correction predictor 204 together. The training is carried out using back propagation or any other neural network training algorithm. A back propagation algorithm comprises inputting a labeled training data instance to the neural network, propagating the training instance through the neural network (referred to as forward propagation) and observing the output. The training data instance is labeled and so the ground truth output of the neural network is known and the difference or error between the observed output and the ground truth output is found and provides information about a loss function. A search is made to try find a minimum of the loss function which is a set of weights of the neural network that enable the output of the neural network to match the ground truth data. Searching the loss function is achieved using gradient descent or stochastic gradient descent or in other ways.

The training data comprises tuples, each tuple having context words, a list of probabilities from the input probability generator 208 and a corresponding ground truth word. The training data is obtained by empirically observing user input using a virtual keyboard, where appropriate consent has been given to observe and use the training data. A user enters context words which are observed and the user begins to enter characters. Key press evidence is generated and observed and eventually the user enters a complete word which is observed as a ground truth word corresponding to the key press evidence and the context words.

Figure 3:
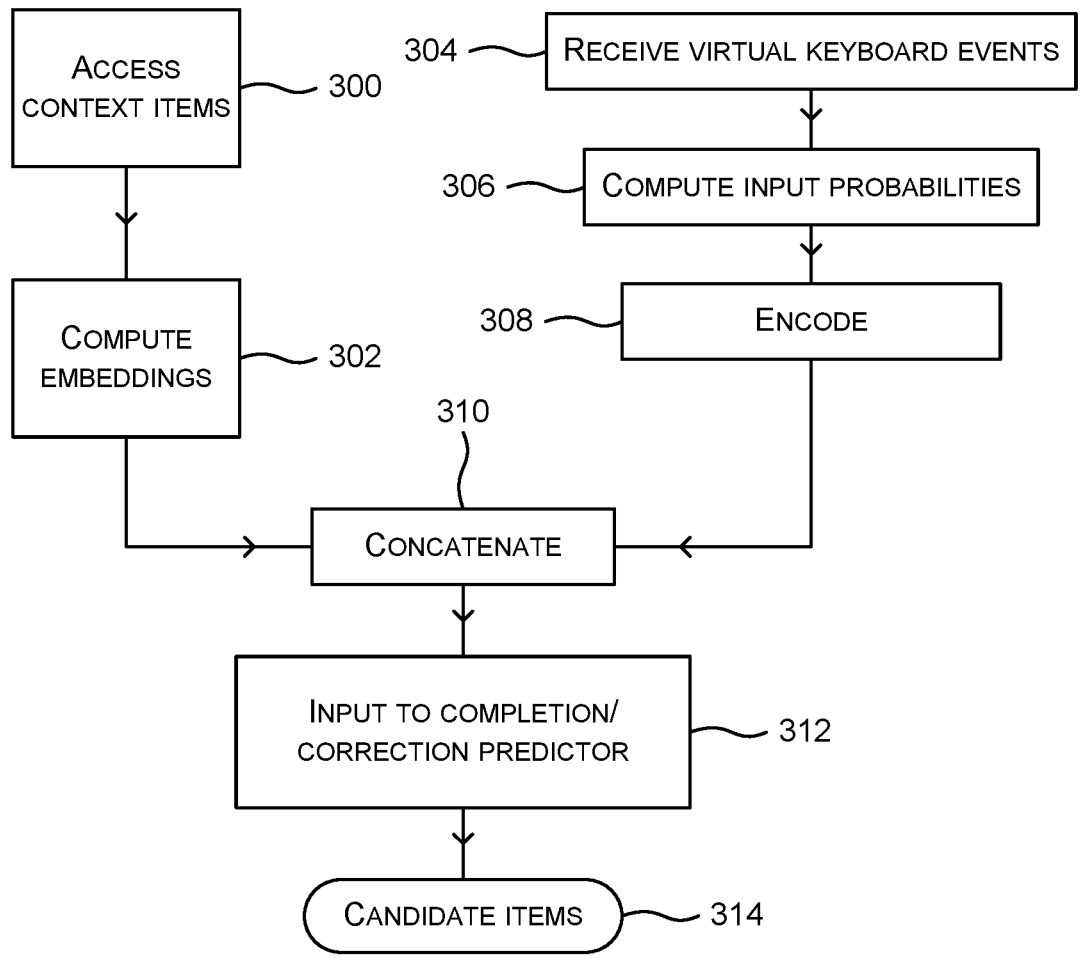
FIG. 3 is a flow diagram of a method of operation at the data input system of FIG. 2.

FIG. 3 is a flow diagram of a method of operation at the data input system 108. Context items are accessed 300 which are text items that the user has already entered using the data entry system 108 such as "I am a" in the example mentioned above. The context items can be paragraphs of text, single characters, or other context items. In the case of a beginning of a sentence a context item is generated such as a start of sequence identifier which has a corresponding embedding. Embeddings of the context items are computed, either by look up in a store of pre-computed embeddings or by computing these using a neural network as described above with reference to FIG. 2.

A user input event is received 304 at the virtual keyboard. Key press evidence is computed 306 using an input probability generator 208 as described above. The key press evidence is fed to a key press encoder and encoded 308 to generate a numerical encoding. The numerical encoding is concatenated 310 with the predicted next item embedding from the context encoder. The concatenated data is input 312 to a completion/correction predictor which computes one or more candidate items 314. The candidate items 314 are presented to the user as candidates for data entry via the virtual keyboard 200.

The operations 304, 306, 308, 310 and 312 repeat each time a new user input event occurs at the virtual keyboard. In this way the candidate items 314 update each time a user makes an input at the virtual keyboard 200. However, it is not essential to repeat these operations for every user input event.

Figure 4:
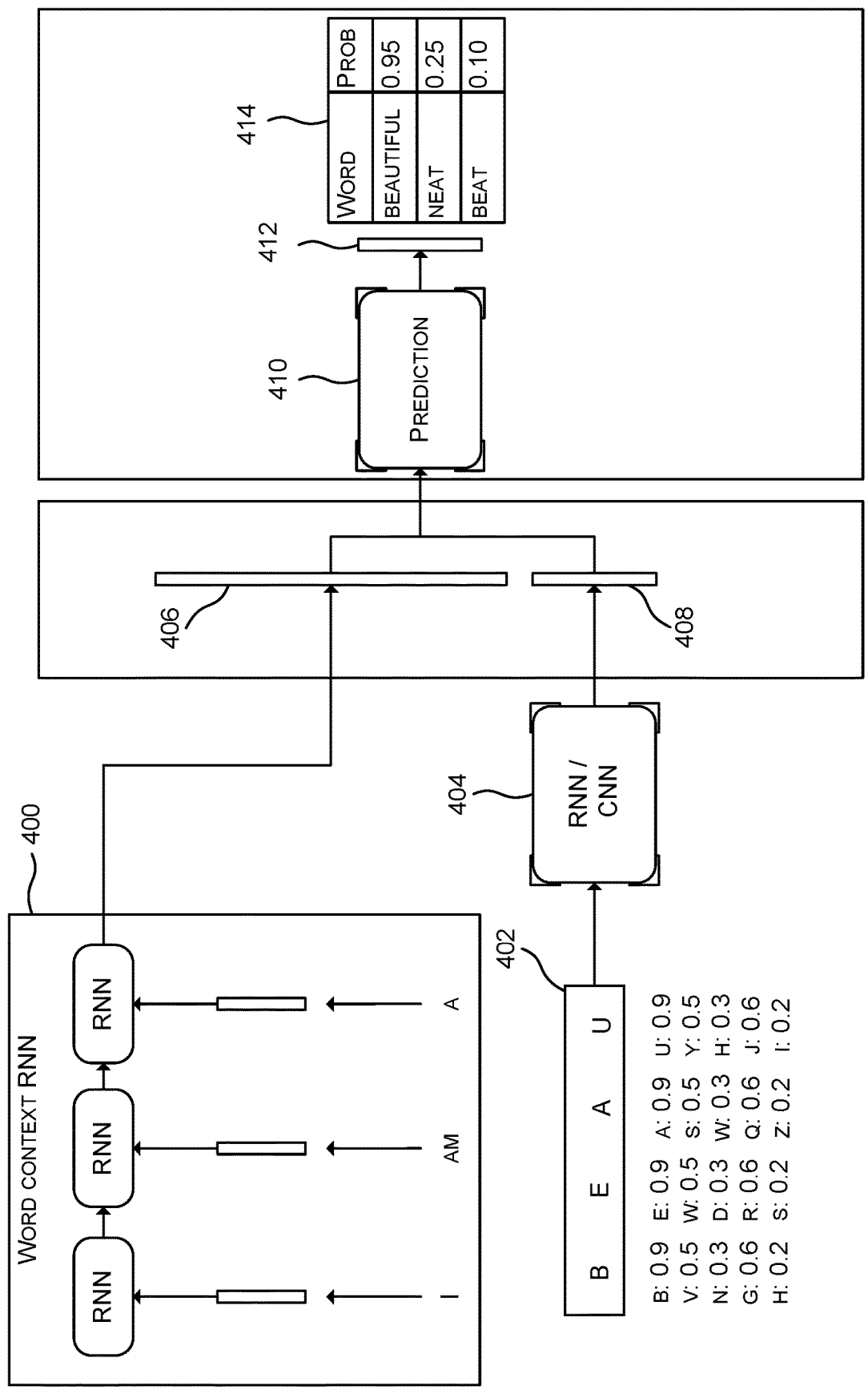
FIG. 4 is a schematic diagram of another example of a data input system.

FIG. 4 is a schematic diagram of an example of a data entry system 108. In this example the virtual keyboard 200, target model sets 210 and the input probability generator 208 are not shown for the sake of clarity. The input probability generator 208 has received information about four user input events in which the user entered the characters "BEAU" as indicated in box 402 of FIG. 4. The input probability generator 208 has computed five probabilities associated with each of the four user input events. The first user input event resulted in the character "B" and for this user input event the five probabilities are: the probability that the user input event was to input the character "B" is 0.9, the probability that the user input event was to input the character "V" is 0.5, the probability that the user input event was to input the character "N" is 0.3, the probability that the user input event was to input the character "G" is 0.6, the probability that the user input event was to input the character "H" is 0.2. In a similar way give probabilities are shown in FIG. 4 for the other user input events.

The probabilities from the input probability generator are input to the key press encoder 404 which is a recurrent neural network (RNN) or a convolutional neural network (CNN) and this produces a numerical encoding 408.

The context encoder 202 comprises a word context recurrent neural network 400 in this example. The context words are "I am a" in the example illustrated in FIG. 4. The word "I" is converted to an embedding as described above and input to the recurrent neural network 400. A hidden state is computed and input to the recurrent neural network together with the embedding of the word "am". Another hidden state is computed and input to the recurrent neural network together with the embedding of the word "a". A hidden state is computed and is embedding 406 which is concatenated with the numerical encoding 408 of the key press encoder. The concatenated data is input to a prediction component 410 comprising a completion/correction predictor 204 which computes an output embedding 412 that is used to compute a plurality of candidate text items 414. In this example the candidate text items are "beautiful" with a probability of 0.95, "neat" with a probability of 0.25, and "beat" with a probability of 0.10. In FIG. 4 the three nodes labeled RNN in the word context RNN 400 depict three states of a cell of the recurrent neural network. The recurrent neural network 400 is the network that performs an "unrolling" of the cell over a sequence and this sequence is depicted schematically by the three nodes labeled RNN in FIG. 4.

Figure 5:
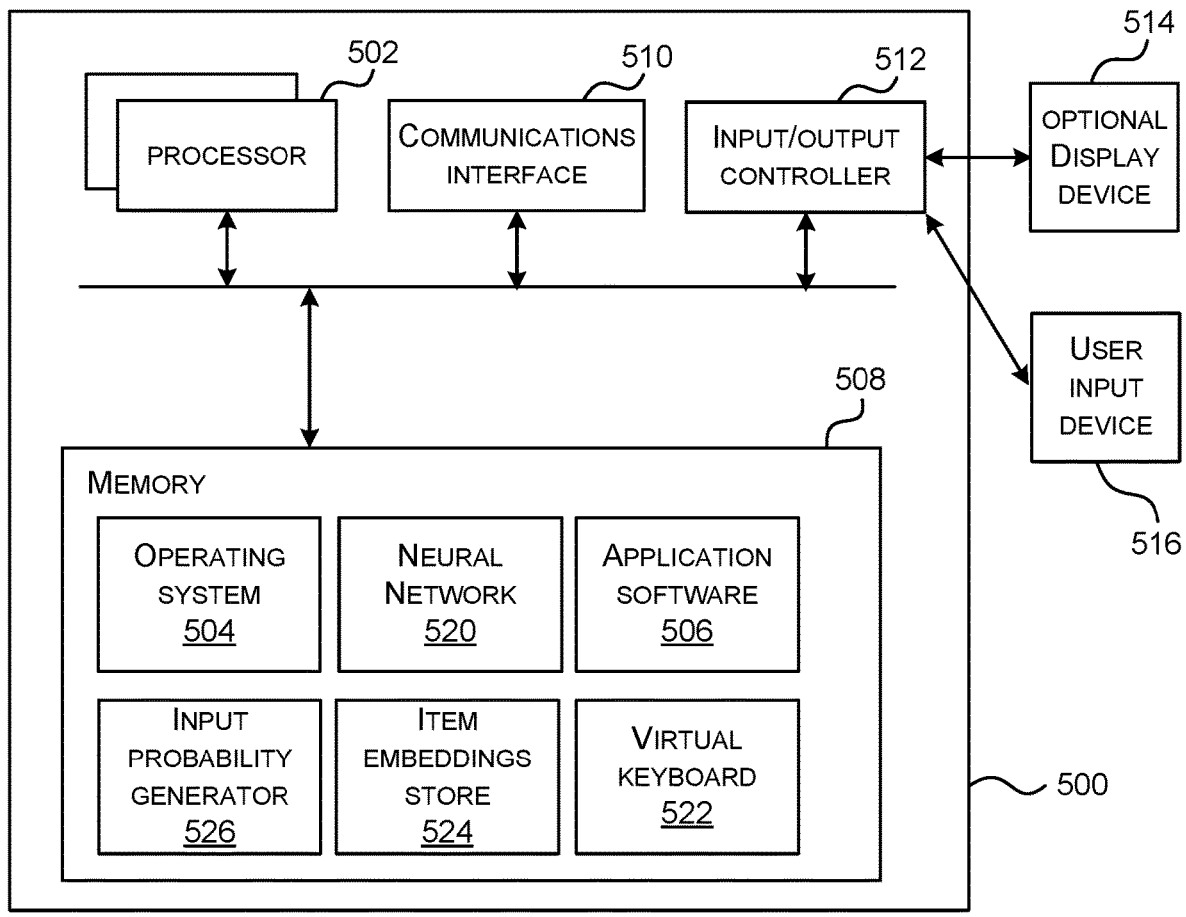
FIG. 5 illustrates an exemplary computing-based device in which embodiments of a data entry system with a virtual keyboard are implemented.

FIG. 5 illustrates various components of an exemplary computing-based device 500 which are implemented as any form of a computing and/or electronic device, and in which embodiments of a data entry system 108 are implemented in some examples.

Computing-based device 500 comprises one or more processors 502 which are microprocessors, controllers or any other suitable type of processors for processing computer executable instructions to control the operation of the device in order to facilitate data entry to the computing-based device 500. In some examples, for example where a system on a chip architecture is used, the processors 502 include one or more fixed function blocks (also referred to as accelerators) which implement a part of the method of FIG. 3 in hardware (rather than software or firmware). Platform software comprising an operating system 504 or any other suitable platform software is provided at the computing-based device to enable application software 506 to be executed on the device. The application software may comprise a messaging application, a content authoring application, an information retrieval application or others where data is to be input by the user. The computing-based device 500 has a virtual keyboard 522, an input probability generator 526, an optional item embeddings store 524, and a neural network component 520. The neural network component 520 comprises the key press encoder, context encoder and completion/correction predictor described herein.

The computer executable instructions are provided using any computer-readable media that is accessible by computing based device 500. Computer-readable media includes, for example, computer storage media such as memory 508 and communications media. Computer storage media, such as memory 508, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 508) is shown within the computing-based device 500 it will be appreciated that the storage is, in some examples, distributed or located remotely and accessed via a network or other communication link (e.g. using communication interface 510 which is a network card, transceiver or other communication interface).

The computing-based device 500 also comprises an input/output controller 512 arranged to output display information to a display device 514 which may be separate from or integral to the computing-based device 500. The display information provides a virtual keyboard and optionally other graphical user interfaces. The input/output controller 512 is also arranged to receive and process input from one or more devices, such as a user input device 516 (e.g. a mouse, keyboard, camera, microphone or other sensor). In some examples the user input device 516 detects voice input, user gestures or other user actions and provides a natural user interface (NUI). This user input may be used to type text into the virtual keyboard 522, enter data and for other purposes. In an embodiment the display device 514 also acts as the user input device 516 if it is a touch sensitive display device. The input/output controller 512 outputs data to devices other than the display device in some examples, e.g. a locally connected printing device.

Any of the input/output controller 512, display device 514 and the user input device 516 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

The virtual keyboard 522 and/or operating system 504 comprise exemplary means for receiving user input events as a result of a user making user input events associated with keys of a virtual keyboard. The input probability generator 208 comprises exemplary means for computing keypress evidence comprising probabilities that a plurality of the user input events at the virtual keyboard correspond to each of a plurality of possible characters. The key press encoder comprises exemplary means for encoding the keypress evidence into a numerical encoding. The completion/correction predictor comprises exemplary means for computing a text item in the text sequence.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A data input system comprising a processor and a memory communicatively coupled to the processor, the memory storing thereon computer-readable instructions that, when executed by the processor, cause the data input system to perform operations comprising:
    instantiating a virtual keyboard configured to receive a text sequence for entry into the data input system, the text sequence including at least one context word and at least one partial word;
    identifying keypress evidence for one or more characters in the at least one partial word of the text sequence, the keypress evidence comprising one or more probabilities that user input events at the virtual keyboard correspond to characters or keyboard functions;
    invoking a trained keypress encoder, wherein the trained keypress encoder is trained using previous keypress evidence and corresponding words, the trained keypress encoder configured to encode the keypress evidence into a numerical encoding, wherein a portion of the numerical encoding corresponds to the at least one partial word;
    generating, by a trained context encoder, an embedding of one or more candidate text items using a portion of the numerical encoding corresponding to the at least one context word of the text sequence; and
    determining a predicted text item corresponding to the at least one partial word, using a neural network, based at least in part on inputs to the neural network including a concatenated vector formed from the portion of the numerical encoding corresponding to the at least one partial word and the embedding of the one or more candidate text items.

2. The data input system of claim 1, wherein the trained keypress encoder is trained using data associated with a single user such that the keypress encoder is personalized to the single user.

3. The data input system of claim 1, wherein the trained keypress encoder is trained using data associated with a single type of virtual keyboard such that the keypress encoder is customized to the single type of virtual keyboard.

4. The data input system of claim 1, wherein the trained keypress encoder is trained using data obtained from a single type of electronic device such that the keypress encoder is customized to the single type of electronic device.

5. The data input system of claim 1, wherein the predicted text item one or more of:
    words, emoji, pictograms, and stickers.

6. The data input system of claim 1, wherein the keypress evidence is computed using a target model set comprising a learned probability distribution for each of a plurality of characters.

7. The data input system of claim 1, wherein the keypress evidence is computed using coordinates of user input events received at the virtual keyboard.

8. The data input system of claim 1, wherein the trained keypress encoder comprises a second neural network.

9. The data input system of claim 1, wherein the trained keypress encoder comprises a recurrent neural network.

10. The data input system of claim 1, wherein the trained keypress encoder comprises a convolutional neural network.

11. The data input system of claim 1, wherein the predicted text item is determined using the neural network trained to predict a word given historical data including numerical encodings of key press evidence and numerical encodings of context words and partial words, the historical data comprising the one or more text items of the text sequence already input to the data input system.

12. The data input system of claim 1, wherein the predicted text item is determined using a third neural network.

13. The data input system of claim 1, further comprising computer-readable instructions that, when executed by the processor, cause the data input system to perform operations comprising rendering the predicted item in the text sequence at the virtual keyboard as a proposed completion or a correction of a text item which a user is trying to input.

14. A computer-implemented data input method; the method comprising:
   determining, by a computing device, user input events based on a text sequence input received via a virtual keyboard, the text sequence including at least one context word and at least one partial word;
   identifying keypress evidence for one or more characters in the at least one partial word of the text sequence, the keypress evidence comprising one or more probabilities that a plurality of the user input events correspond to each of a plurality of possible characters or keyboard functions;
   encoding the keypress evidence into a numerical encoding using a trained keypress encoder, the trained keypress encoder trained using previous keypress evidence and corresponding words, wherein a portion of the numerical encoding corresponds to the at least one partial word;
   generating, by a trained context encoder, an embedding of one or more candidate text items using a portion of the numerical encoding corresponding to the at least one context word of the text sequence; and
   computing a text item in the text sequence corresponding to the at least one partial word, using a neural network, based on inputs to the neural network including a concatenated vector formed from the portion of the numerical encoding corresponding to the at least one partial word and the embedding of the one or more candidate text items.

15. The method of claim 14, further comprising training the trained keypress encoder using the computed keypress evidence and corresponding words.

16. The method of claim 14, further comprising training the trained keypress encoder using training data determined based on data input behavior of a single user.

17. The method of claim 14, further comprising training the trained keypress encoder using training data determined based on data input behavior at a single type of virtual keyboard.

18. The method of claim 14, further comprising training a completion/correction predictor and a context encoder together with the keypress encoder, wherein the completion/correction predictor is configured to computed the keypress evidence and the context encoder is configured to encode the keypress evidence.

19. The method of claim 14, further comprising computing a measure of similarity of the computed text item with other text items.

20. A computer-readable storage medium storing thereon computer-executable instructions that, when executed by a computing system, cause the computing system to perform operations comprising:
   receiving, via a virtual keyboard, user input events indicative of a text sequence;
   computing keypress evidence comprising one or more probabilities that the user input events correspond to characters or keyboard functions;
   encoding the keypress evidence into a numerical encoding using a trained keypress encoder comprising a neural network, wherein a portion of the numerical encoding corresponds to the at least one partial word; and
   computing a text item in the text sequence corresponding to the at least one partial word, using a second neural network, based on inputs to the neural network including a concatenated vector formed from the portion of the numerical encoding corresponding to the at least one partial word and an encoding of one or more text items of the text sequence already input to the computing system.

* * * * *